United States Patent [19]
Hwang

[11] Patent Number: 5,666,160
[45] Date of Patent: Sep. 9, 1997

[54] DIGITAL ZOOMING SYSTEM OF HIGH RESOLUTION AND METHOD THEREFOR

[75] Inventor: Jung-Hyun Hwang, Seoul, Rep. of Korea

[73] Assignee: Samsung Electronics Co., Ltd., Suwon, Rep. of Korea

[21] Appl. No.: 656,808

[22] Filed: Jun. 3, 1996

[30]  Foreign Application Priority Data

Nov. 15, 1995 [KR] Rep. of Korea ............... 95-41540

[51] Int. Cl.⁶ .................... H04N 5/262; H04N 9/74
[52] U.S. Cl. ............... 348/240; 348/561; 348/581; 348/208
[58] Field of Search ............... 348/222, 208, 348/239, 240, 561, 581, 699, 700, 704; H04N 5/262, 9/74

[56]  References Cited

U.S. PATENT DOCUMENTS

| | | | |
|---|---|---|---|
| 5,083,208 | 1/1992 | Hatanaka | 348/240 |
| 5,307,167 | 4/1994 | Park | 348/704 |
| 5,371,539 | 12/1994 | Okino | 348/222 |
| 5,493,333 | 2/1996 | Hirose | 348/208 |

OTHER PUBLICATIONS

Authors: J.H. Paik, J.K. Paik, J. H. Hwang; Title: A Study on Improving the Resolution of Multichannel Images; Periodical: *Proceedings of the 1995 Korean Processing Conference*; pp. 211–215.

*Primary Examiner*—Michael H. Lee
*Assistant Examiner*—Sherrie Hsia
*Attorney, Agent, or Firm*—Cushman Darby & Cushman, IP Group of Pillsbury Madison & Sutro LLP

[57]  ABSTRACT

A digital zooming system determines subpixel image information by detecting a camera motion component from a dynamic image (pixel images from across more than one image frame), the motion component being generated in an interval less than the standard interval between pixels. The system enhances the resolution of the magnified image by synthesizing the image signal through an IIR filter. This preserves image quality when magnifying the input image by a digital zoom. Accordingly, a high resolution image is obtained, and degradation and noise generated by interpolating the input image are reduced.

19 Claims, 6 Drawing Sheets

DIGITAL ZOOMING SYSTEM OF HIGH RESOLUTION AND METHOD THEREFOR

BACKGROUND OF THE INVENTION

(1) Field of the Invention

The present invention relates to a high quality and high resolution digital zooming system and method. More particularly, this invention relates to a high resolution digital zooming system and method which enhances the resolution of a camera image by extracting and using dynamic image information from across a plurality of image sequences.

(2) Description of the Related Art

Techniques for magnifying images have been developed using image processing techniques. When magnifying an image, the number of pixels for displaying the image increases; accordingly, image magnification is closely related with resolution enhancement.

Generally, methods to form high resolution magnified images from small-sized low resolution images employ an interpolation algorithm which only uses information from spatially adjacent pixels in a static image. However, because the quantity of image information remains constant, such methods can increase the size of the image, but can not substantially enhance its resolution. One such method was described in the U.S. Pat. No. 5,307,167, issued Mar. 16, 1992, and entitled "Digital Zooming System Utilizing Image Buffers and Employing an Approximated Bilinear Interpolation Method" (Inventors: Sung-Wook Park and Joon-Ki Paik, Assignee: Samsung Electronics Co., Ltd.).

A conventional zoom system will now be described with reference to FIGS. 1 through 4.

As shown in FIG. 1, an image is sampled by a regular sampling interval (namely, a distance between pixels) about an input image. In the drawings, two-dimensional image signals are regarded as one-dimensional image signals in order to more simply facilitate an understanding of image magnification theory. Herein, subpixel image information (information between pixels in the image corresponding to a magnified zoom image centered about a target within the image) is not obtained, so the amount of obtainable image resolution corresponds to the sampling frequency used. The subpixel information needed for image magnification is instead determined by interpolating from the known image information of adjacent pixels.

FIG. 2 shows an example of a conventional zoom method using interpolation. In this example, subpixel information P'(x') (where x'=0, 1, . . . N, N−1) needed to magnify an image by two times is estimated by first order interpolation. The subpixel information can be expressed by the following equation.

$$P'(x')=(m-k) \cdot P(x)+k \cdot P(x+1), (x=0, 1, \ldots, N-1)$$

where k (0<k≦1) is an interpolation coefficient. In FIG. 2, the value of k is 0.5.

By applying the above method to both the horizontal and vertical components of the image, a spatially interpolated image can be obtained. Although various image processing methods have been adopted to preserve the higher frequency image components (e.g., second order interpolation, interpolation by frequency analysis, and inverse filters), the image resolution obtainable using interpolation is still limited by the sampling frequency.

FIG. 3 shows an example of a conventional digital zoom system used in a video camera. In the operation of this system, an image input through a lens is converted to an electrical signal by a charge coupled device ("CCD") 31, and is then converted to a digital signal by an analog-to-digital converter ("ADC") 32. A digital zoom 33 spatially magnifies the image signal using first order interpolation. Finally, a digital-to-analog converter ("DAC") 34 outputs a resultant image signal.

FIG. 4 shows another example of a conventional digital zoom system used in a video camera. This zoom system compensates for image shaking, such as that caused by hand motions in a hand-held camera, by detecting the pixel motion of an image, and then performing a digital zoom function about the compensated image.

In the operation of the system of FIG. 4, an image input through a lens is converted to an electrical image signal by a CCD 41. The electrical image signal is converted to a digital signal by an ADC 42. A motion detector 43 detects pixel motion from the input image signal. A digital image stabilizer 44 stabilizes the input image signal. A digital zoom 45 spatially magnifies the input image signal using first order interpolation. Finally, a DAC 46 outputs a resultant image signal.

In conventional digital zooming systems, the method used to spatially magnify image data is responsive only to a partial area of the input image. Therefore, spatial resolution is inversely proportional to a scale factor of a screen. This degrades image quality and limits magnification.

SUMMARY OF THE INVENTION

An object of the present invention is to provide a high quality digital zooming system and method.

It is another object of the present invention to provide a digital zooming system which magnifies an input image without degrading image quality.

It is another object of the present invention to provide a digital zooming system which enhances the resolution of a magnified input image.

In order to achieve these and other objects, a digital zooming system according to the present invention determines subpixel image information by detecting a camera motion component from a dynamic image (pixel images from across more than one image frame), the motion component being generated in an interval less than the standard interval between pixels. The system enhances the resolution of the magnified image by synthesizing the image signal through an infinite impulse response ("IIR") filter. This preserves image quality when magnifying the input image by a digital zoom.

BRIEF DESCRIPTION OF THE DRAWINGS

The preferred embodiments of the present invention will now be described more specifically with reference to the attached drawings, wherein.

DETAILED DESCRIPTION OF THE PREFERRED EMBODIMENTS

Figure 6:
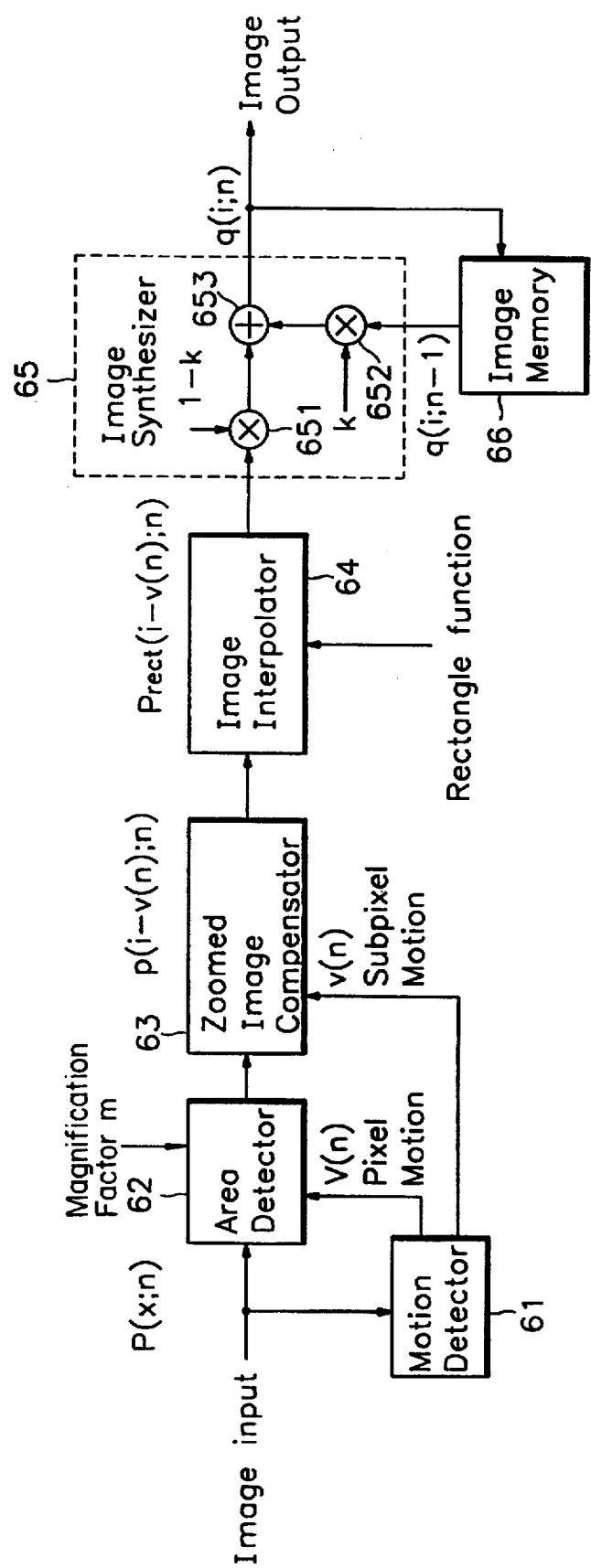
FIG. 6 is a block diagram illustrating a first embodiment of a digital zooming system in accordance with the present invention, which forms a high quality image by using both a phase difference from an image signal and an IIR filter.

Illustrated in FIG. 6 is a high quality digital zooming system according to a first embodiment of the present invention.

Motion detector 61 receives an image signal P(x;n) as an input, detects horizontal and vertical components of both a pixel motion and a subpixel motion, and outputs the pixel motion signal V(n) and subpixel motion signal v(n).

Area detector 62 also receives the image signal P(x;n), adjusts the image signal P(x;n) according to the horizontal and vertical pixel motions V(n) received from the motion detector 61, and detects a zoom area in accordance with a zoom magnification factor m.

Zoomed image compensator 63 receives the signal output from the area detector 62 as an input, spatially magnifies a sampling interval of the detected image, and adjusts the zoomed image according to the horizontal and vertical subpixel motions v(n) received from the motion detector 61.

Image interpolator 64 receives the known pixel information corresponding to the spatially zoomed image p(i−v(n) ;n) from the zoomed image compensator 63 as an input, performs a convolution between the known pixel information and a rectangle function, and thus extends the image resolution range to subpixels adjacent to the known pixel.

Image synthesizer 65 receives the signal $P_{rect}(i-v(n);n)$ output from the image interpolator 64 and a previous image signal q(i;n−1) from the first previous field (or frame), synthesizes the output signal $P_{rect}(i-v(n);n)$ and the previous image signal q(i;n−1) using an IIR filter having a weighted time value, and outputs the resultant image signal q(i;n).

Image memory 66 stores the resultant image signal q(i;n), and feeds back the previous image signal q(i;n−1) to the image synthesizer 65. Herein, x, i, V(n), and v(n) are two-dimensional space vectors.

The image synthesizer 65 further includes a first multiplier 651 which receives an image signal $P_{rect}(i-v(n);n)$, which has been adjusted for motion and zoom area, and a weighted time value (1−k) as inputs, and multiplies the image signal $P_{rect}(i-v(n);n)$ by the weighted time value (1−k). Second multiplier 652 receives the previous image signal q(i;n−1) stored in the image memory 66 and a weighted time value k as inputs, and multiplies the previous image signal q(i;n−1) by the weighted value k. Adder 653 receives the outputs from the first multiplier 651 and the second multiplier 652, adds them together, and outputs a resultant image signal q(i;n).

Figure 8:
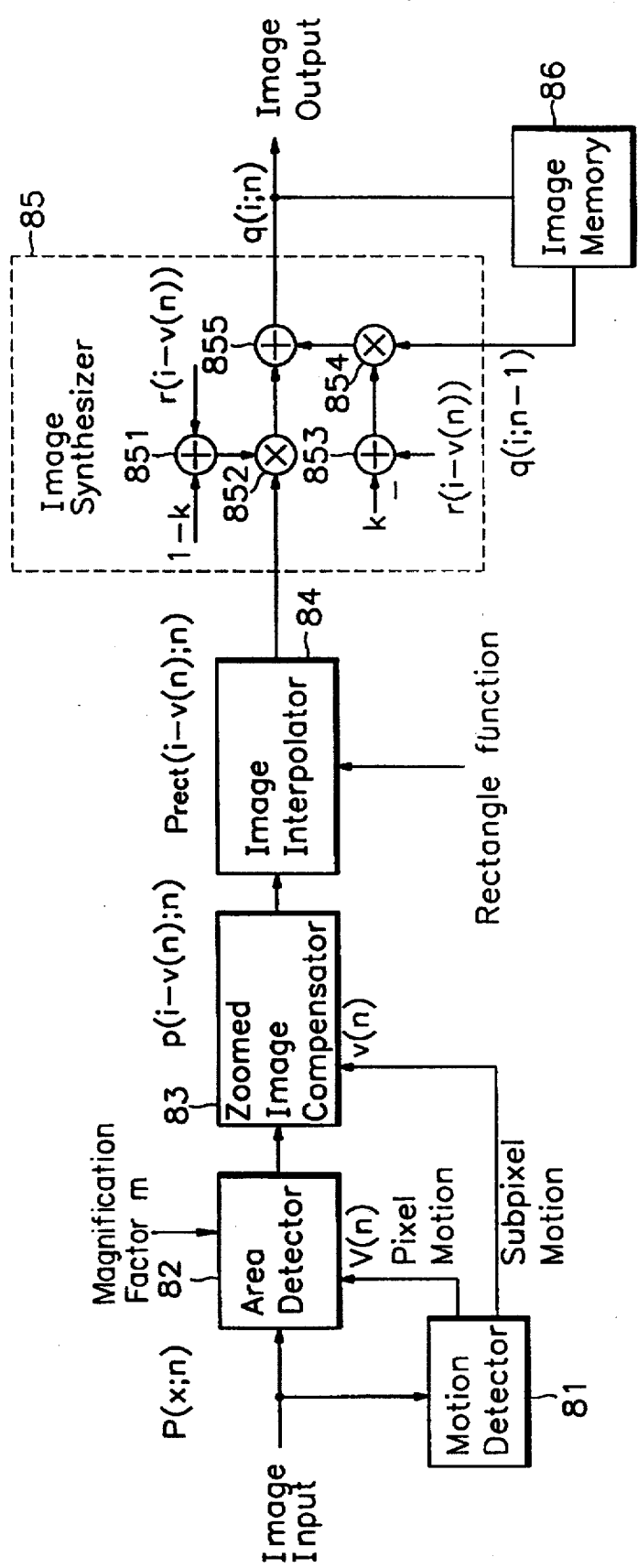
FIG. 8 is a block diagram illustrating a second embodiment of a digital zooming system in accordance with the present invention, which forms a high quality image by using a value which is flexibly-weighted according to a phase difference of the image, and an IIR filter.

Illustrated in FIG. 8 is a high quality digital zooming system according to a second embodiment of the present invention.

Motion detector 81 receives an image signal P(x;n) as an input, detects horizontal and vertical components of both a pixel motion and a subpixel motion, and outputs the pixel motion signal V(n) and subpixel motion signal v(n).

Area detector 82 also receives the image signal P(x;n), adjusts the image signal P(x;n) according to the horizontal and vertical pixel motions V(n) received from the motion detector 81, and detects a zoom area in accordance with a zoom magnification factor m.

Zoomed image compensator 83 receives the signal output from the area detector 82 as an input, spatially magnifies a sampling interval of the detected image, and adjusts the zoomed image according to the horizontal and vertical subpixel motions v(n) received from the motion detector 81.

Image interpolator 84 receives the known pixel information corresponding to the spatially zoomed image p(i−v(n) ;n) from the zoomed image compensator 83 as an input, performs a convolution between the known pixel information and a rectangle function, and thus extends the image resolution range to unknown pixels adjacent to the known pixel.

Image synthesizer 85 receives the signal $P_{rect}(i-v(n);n)$ output from the image interpolator 84 and a previous image signal q(i;n−1) from the first previous field (or frame), synthesizes the output signal $P_{rect}(i-v(n);n)$ and the previous image signal q(i;n−1) using an IIR filter having a weighted time value, and outputs the resultant image signal q(i;n).

Image memory 86 stores the resultant image signal q(i;n), and feeds back the previous image signal q(i;n−1) to the image synthesizer 85. Herein, x, i, V(n), and v(n) are two-dimensional space vectors.

The image synthesizer 85 further includes a first adder 851 which receives a weighted time value (1−k) and a weighted spatial value r(i−v(n)) as inputs, and adds them together. First multiplier 852 receives an image signal $P_{rect}$ (i−v(n);n), which has been adjusted for motion and zoom area and the output signal from the first adder 851 as inputs, and multiplies the image signal $P_{rect}(i-v(n);n)$ by the result from the first adder 851. Adder-subtractor 853 receives a weighted time value k and the weighted spatial value r(i−v(n)) as inputs, and combines them to form a result. Second multiplier 854 receives a previous image signal q(i;n−1) and the output from adder-subtractor 853, and multiplies the previous image signal q(i;n−1) by the result from the adder-subtractor 853. Second adder 855 receives the output signals from the first and second multipliers 852 and 854 as inputs, adds them together, and outputs the resultant image signal q(i;n).

The present invention provides a digital zooming technique which enhances image resolution by using a dynamic image which has more information than a static image. The system detects a motion component from the dynamic image, properly adjusts the dynamic image for the detected motion, and thus determines interval image information (namely, subpixel information) between pixels. That is, the present invention extracts subpixel information from a minute phase difference generated by a camera motion.

There are two kinds of camera motion: passive image shaking due to hand motions in a hand-held camera, and active image shaking generated when a CCD or a lens in a light receiving portion of the camera oscillates according to a specific frequency. The present invention can be applied to both kinds of camera motion.

To obtain a motion component for this image shaking, a pixel motion and a subpixel motion should be accurately calculated. The subpixel information of a detected motion component corresponds to a phase difference with respect to a spatial image sampling frequency.

The present invention adjusts a past image and a current image using subpixel information determined for each of the past and current images, filters the images using flexible time and spatial weighted values, and outputs the synthesized images. More particularly, in the present invention, by passing the past and current images through a low pass IIR filter according to a time axis, the image signal can be adequately compensated for the subpixel image information, and a weighted phase value can be controlled.

Figure 1:
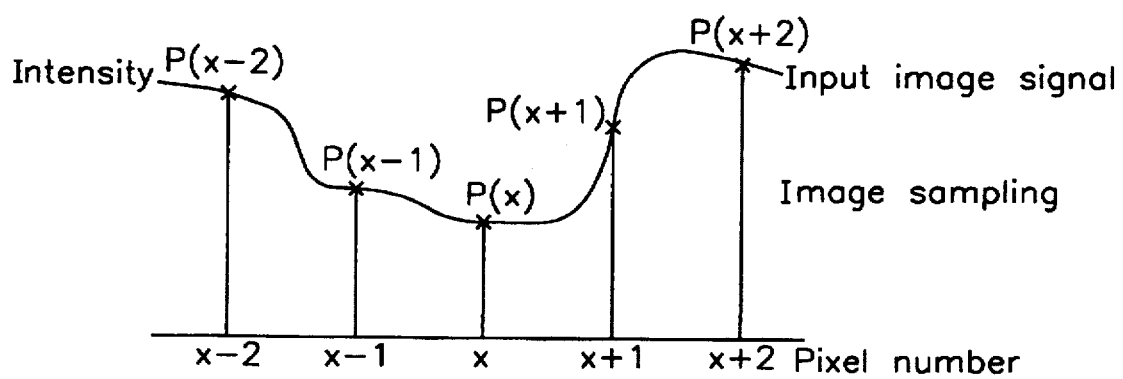
FIG. 1 is a diagram illustrating the principles for sampling a one-dimensional image signal of an input image.
Figure 2:
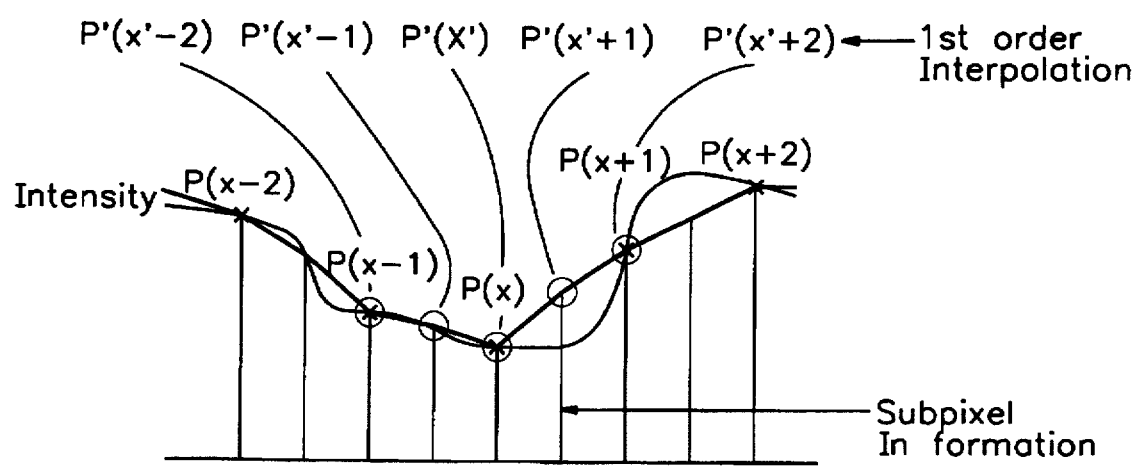
FIG. 2 is a diagram illustrating a conventional zoom method which interpolates an image between adjacent pixels in order to determine image information between the pixels.
Figure 3:
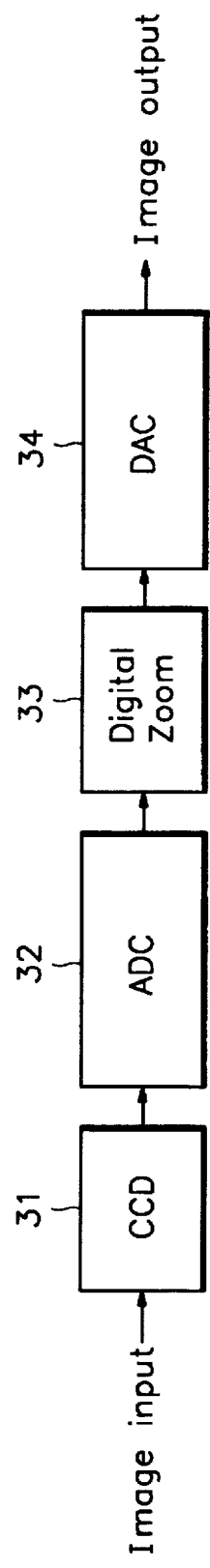
FIG. 3 is a block diagram of a conventional zoom system used in processing an image signal from a camera.
Figure 4:
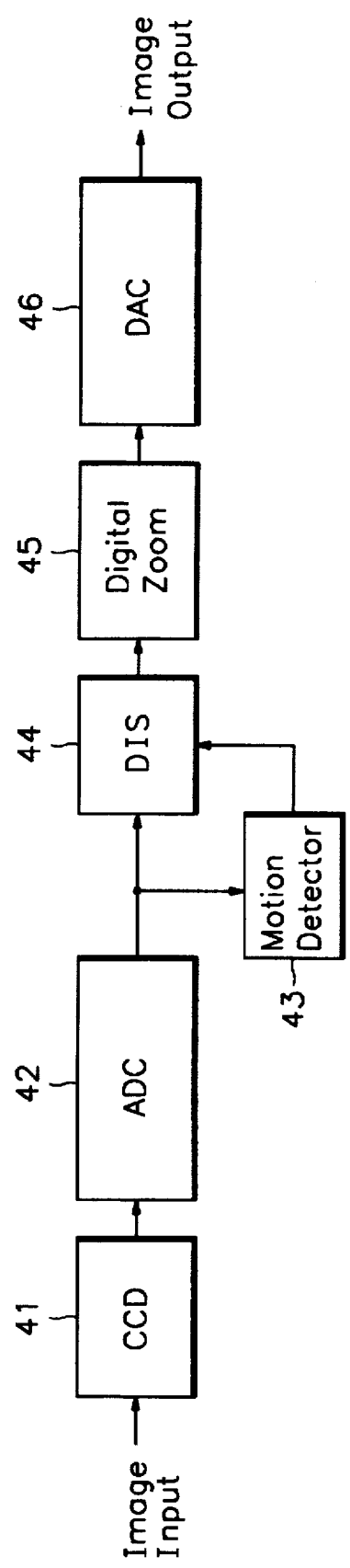
FIG. 4 is a block diagram of another conventional zoom system including a digital image stabilizing function, used in processing an image signal from a camera.
Figure 5:
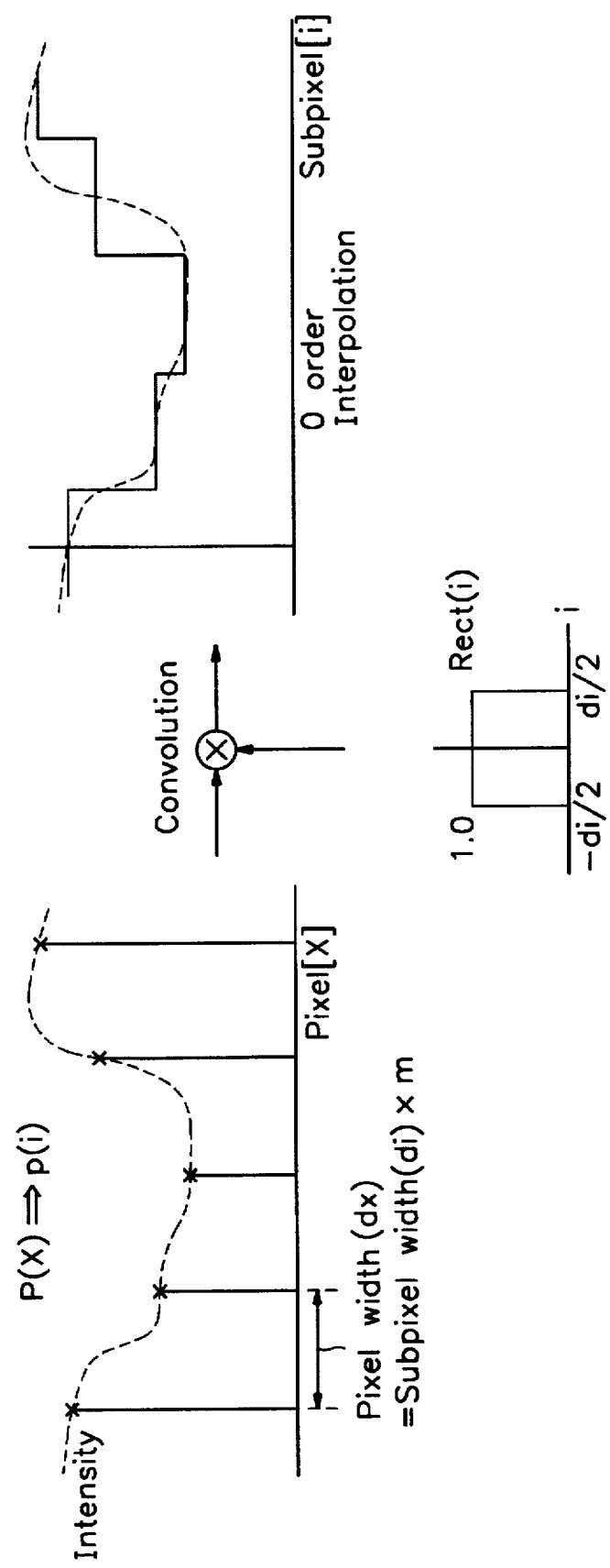
FIG. 5 shows a principle for interpolating an image signal by a convolution process using a sampled input image and a rectangle function in accordance with a preferred embodiment of the present invention.

As shown in FIG. 5, when a sampling interval is proportional to a magnification m with respect to a zoom area within an input image P(x), the input image P(x) is converted to an extended image signal p(i), and is undersampled as regards subpixels. Herein, dx represents an interval between pixels, and is composed of m subpixels having an interval of di. The extended image signal p(i) is then convoluted by a rectangle function Rect(i) as shown in the following equation, and a dense image signal $P_{rect}(i)$ is obtained by zero order interpolation.

$$P_{rect}(i) = p(i) * Rect(i)$$

It should be apparent that when the motion-compensated signal p(i−v(n)) is used as an input in the above equation in place of p(i), the resulting signal is $P_{rect}(i-v(n);n)$.

According to a first embodiment of a digital zooming system shown in FIG. 6, the signals $P_{rect}(i-v(n);n)$ and q(i;n−1) are synthesized by a time weighted value k (0<k≦1) according to an IIR filter shown in the following equation, thereby determining the output image q(i;n).

$$q(i;n) = (1-k) \cdot P_{rect}(i-v(n);n) + k \cdot q(i;n-1), \quad (n=1, 2, \ldots)$$

where an initial output image q(i;0) is $P_{rect}(i-v(0);0)$.

While photographing an image, the relative importance of a past image is higher than that of a current image when the weighted time value k is high. The system can output a stable image having low noise when the weighted value k is about 0.5 to 0.9.

Figure 7:
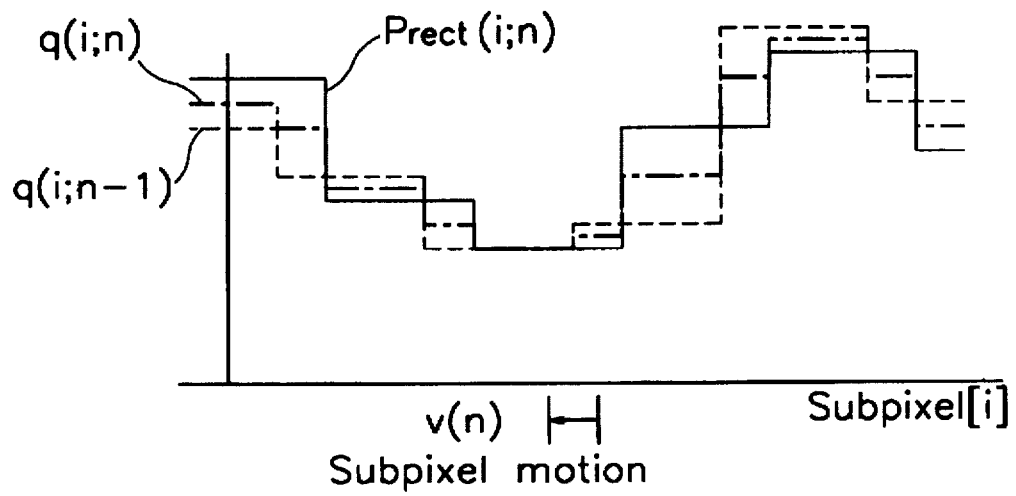
FIG. 7 shows a principle for processing an input image signal, sampled by a phase difference of a subpixel motion due to camera motion, and a previous image signal, using weighted time related values, in accordance with a preferred embodiment of the present invention.

FIG. 7 shows the output image as a one-dimensional signal when a previous image and a current image are processed by an IIR filter having a weighted time value of k=0.5 and where n=1.

To reflect an accurate value of a subpixel on the output image, a zoom method for magnifying the image in which a weighted spatial value is controlled with respect to the phase of a motion component in the input image, is better than uniform diffusion of information according to zero order interpolation. This zoom method can further enhance the resolution of the image, and is described below with reference to a second embodiment in the present invention.

FIG. 8 is a block diagram illustrating a second embodiment of a digital zooming system in accordance with the present invention, which forms a high quality image by using both a flexibly-weighted phase value and an IIR filter.

In the second embodiment, an image synthesizer 85 receives a signal $P_{rect}(i-v(n);n)$ output from the image interpolator 84 and a previous image signal q(i;n−1) from the first previous field (i.e., one frame), synthesizes the output signal $P_{rect}(i-v(n);n)$ and the previous image signal q(i;n−1) using an IIR filter having a weighted time and spatial value, and outputs a resultant image signal q(i;n).

More specifically, the signals $P_{rect}(i-v(n);n)$ and q(i;n−1) are synthesized by both a weighted time value k (0<k≦1) and a weighted spatial value r(i−v(n)) according to an IIR filter shown in following equation, thereby determining the output image q(i;n).

$$q(i;n) = ((1-k) + r(i-v(n))) \cdot P_{rect}(i-v(n);n) + (k - r(i-v(n))) \cdot q(i;n-1),$$

$$(n=1, 2, \ldots)$$

where an initial output image q(i;0) is $P_{rect}(i;0)$.

While photographing an image, the relative importance of a past image is higher than that of a current image when a weighted time value k is high. The system can output a stable image having low noise when the weighted value k is about 0.5 to 0.9. Further, the system can enhance resolution even more by giving a spatially high weight to subpixel information which is centered with respect to a motion component of the input image.

Figure 9:
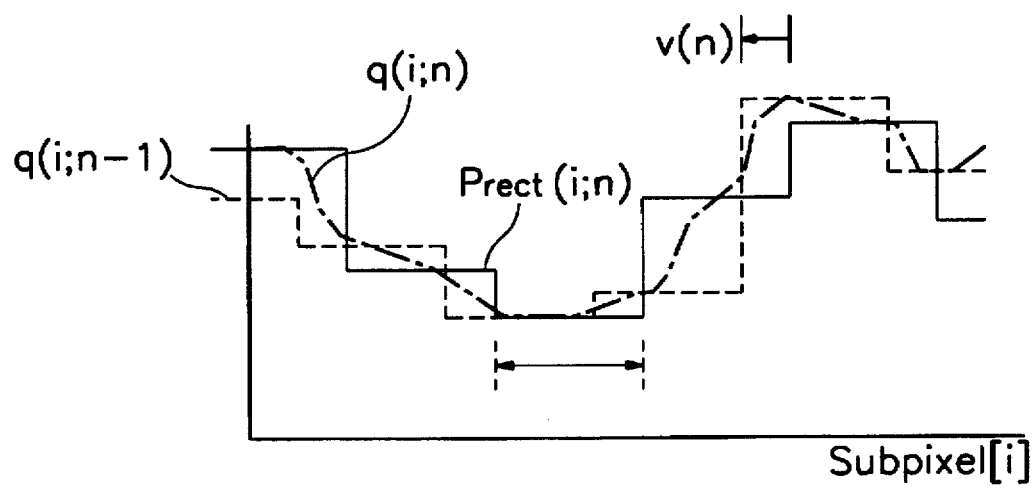
FIG. 9 shows a principle for processing an input image signal, sampled by a phase difference of a subpixel motion due to camera motion, and a previous image signal, using weighted time and space related values, in accordance with a preferred embodiment of the present invention.
Figure 9:
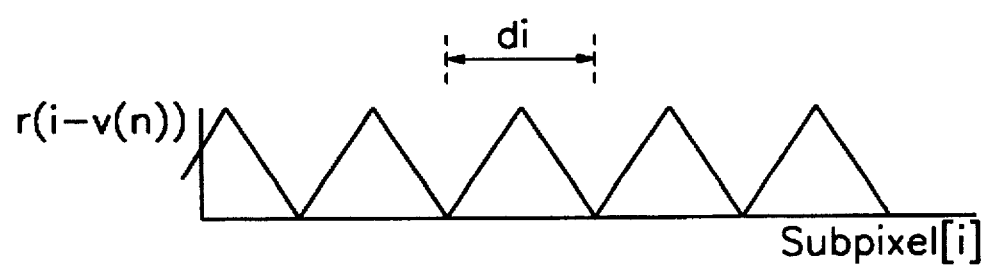

FIG. 9 shows the output image as a one-dimensional signal after a previous image and a current image are processed by both an IIR filter and a spatial weight control, where k=0.5 and n=1. Herein, a spatial weight r(i−v(n)) is a function of which the period is the interval between subpixels. If an amplitude of the image signal is controlled according to a condition of the input image, an enhanced image can be achieved.

In conclusion, when the motion component of a subpixel is detected according to a sequence of image frames over a lapse of time, image resolution is enhanced and a stable image is achieved. In the image in which both a previous image signal stored in an image memory and a phase difference between subpixel motions are considered, a high resolution image can be achieved by properly controlling space and time weights. The high resolution image can be also achieved by an IIR filter and an image memory.

As described above, the present invention can obviate the limitations of spatial resolution in a normal CCD having a limited number of pixels, without requiring an enhanced high resolution CCD or a high power optical zoom lens. Image information between pixels is determined by detecting a motion component across a dynamic image. Accordingly, a high resolution image is obtained, and the degradation and noise generated when magnifying the input image by interpolation are reduced. The resolution is further enhanced by synthesizing the image using an IIR filter.

Although the present invention has been described above with reference to the preferred embodiments thereof, those skilled in the art will readily appreciate that various modifications and substitutions can be made thereto without departing from the spirit and scope of the invention as set forth in the appended claims.

What is claimed is:

1. A digital zooming system, comprising:

a motion detector which detects a pixel motion component and a subpixel motion component in a pixel image;

an area detector which detects a zoom area in said pixel image according to said pixel motion component;

a zoomed image compensator which samples said pixel image at a pixel sample interval within said zoom area detected by said area detector and forms a zoomed image signal having a phase value with respect to said pixel sample interval according to said subpixel motion component;

an image interpolator which interpolates subpixel image information from said zoomed image signal to form a current subpixel image; and an image synthesizer which weights said current subpixel image and a stored subpixel image and combines said weighted images to form a resultant subpixel image.

2. The digital zooming system as defined in claim 1, wherein said pixel and subpixel motion components are both comprised of vertical and horizontal directions.

3. The digital zooming system as defined in claim 1, wherein said image interpolator forms said current subpixel image by convoluting said zoomed image signal with a rectangular function.

4. The digital zooming system as defined in claim 1, wherein said image synthesizer comprises:

a first multiplier which multiplies said current subpixel image with a first weight value;

a second multiplier which multiplies said stored subpixel image with a second weight value; and an adder which sums said weighted images to form said resultant subpixel image.

5. The digital zooming system as defined in claim 4, wherein the sum of said first weight value and said second weight value equals 1, and wherein said second weight value is greater than said first weight value.

6. The digital zooming system as defined in claim 1, wherein said image synthesizer includes:

a first adder which sums a first time weight value and a first spatial weight value and outputs a first weight value;

a first multiplier which multiplies said current subpixel image by said first weight value;

a second adder which sums a second time weight value and a second spatial weight value and outputs a second weight value;

a second multiplier which multiplies said stored subpixel image by said second weight value; and a third adder which sums said weighted current and stored subpixel images to form said resultant subpixel image.

7. The digital zooming system as defined in claim 6, wherein the sum of said first time weight value and said second time weight value equals 1, and wherein said second time weight value is greater than said first time weight value.

8. The digital zooming system as defined in claim 6, wherein said first and second spatial weight values have a magnitude dependent on said subpixel motion component of said pixel image such that said subpixel image information in said current and stored subpixel images is weighted in correspondence with a phase difference with respect to said subpixel motion component.

9. The digital zooming system as defined in claim 1, further comprising an image memory which stores said resultant subpixel image, and supplies said resultant subpixel image as said stored subpixel image to said image synthesizer in a subsequent image frame.

10. The digital zooming system as defined in claim 1, wherein said motion detector detects said pixel and subpixel motion components in correspondence with a motion of a camera.

11. A method for zooming a digital image comprising:

receiving a pixel image;

detecting a pixel motion and a subpixel motion of said pixel image;

detecting a zoom area in said pixel image according to said pixel motion;

sampling said pixel image within said zoom area at a pixel sampling interval to form a zoomed image signal having a phase value with respect to said pixel sample interval according to said subpixel motion;

interpolating subpixel image information from said zoomed image signal to form a current subpixel image;

weighting said current subpixel image with respect to a stored subpixel image and combining said weighted images to form a resultant subpixel image.

12. The method as defined in claim 11, wherein said pixel and subpixel motions are both comprised of vertical and horizontal directions.

13. The method as defined in claim 11, wherein said step of interpolating subpixel image information from said zoomed image signal includes convoluting said zoomed image signal with a rectangular function.

14. The method as defined in claim 11, wherein said stored subpixel image is weighted greater relative to said current subpixel image.

15. The method as defined in claim 11, wherein said current and stored subpixel images are weighted in correspondence with a phase difference with respect to said subpixel motion.

16. The method as defined in claim 11, further comprising a step of storing said resultant subpixel image for use as said stored subpixel image in subsequent processing.

17. The method as defined in claim 11, wherein said step of detecting said pixel and subpixel motions of said pixel image is performed in correspondence with a motion of a camera.

18. The digital zooming system as defined in claim 1, wherein said area detector detects said zoom area in said pixel image according to a zoom magnification factor in addition to said pixel motion component.

19. The method as defined in claim 11, wherein said step of detecting said zoom area in said pixel image is performed according to a zoom magnification factor in addition to said pixel motion.

* * * * *